(12) United States Patent
Chiu et al.

(10) Patent No.: US 12,538,030 B2
(45) Date of Patent: Jan. 27, 2026

(54) CORRECTION AND CAPTURE METHOD FOR BIOLOGICAL PARTICLE CAPTURE DEVICE

(71) Applicant: LiqBio biomedical company limited, New Taipei (TW)

(72) Inventors: Tzu-Keng Chiu, New Taipei (TW); Yu-Xian Zhu, Hsinchu County (TW); Chi-Kun Ohyang, Taoyuan (TW); Cheng-Fang Yang, New Taipei (TW); Lien-Pu Lee, Taipei (TW)

(73) Assignee: LIQBIO BIOMEDICAL COMPANY LIMITED, New Taipei (TW)

( * ) Notice: Subject to any disclaimer, the term of this patent is extended or adjusted under 35 U.S.C. 154(b) by 14 days.

(21) Appl. No.: 18/643,328

(22) Filed: Apr. 23, 2024

(65) Prior Publication Data

US 2025/0133294 A1  Apr. 24, 2025

(30) Foreign Application Priority Data

Oct. 18, 2023  (TW) .................................. 112139779

(51) Int. Cl.
*H04N 23/695* (2023.01)
*G02B 21/32* (2006.01)
*H04N 23/69* (2023.01)

(52) U.S. Cl.
CPC ........... *H04N 23/695* (2023.01); *H04N 23/69* (2023.01)

(58) Field of Classification Search
None
See application file for complete search history.

(56) References Cited

U.S. PATENT DOCUMENTS

2011/0124037 A1  5/2011  Backhaus et al.
2020/0147601 A1*  5/2020  Briggs ..................... B01L 3/02
(Continued)

FOREIGN PATENT DOCUMENTS

CN  108138109 A  6/2018
CN  111093830 A  5/2020
(Continued)

OTHER PUBLICATIONS

European Search Report for European Application No. 24173793.1, dated Oct. 23, 2024.
(Continued)

*Primary Examiner* — Edemio Navas, Jr.
(74) *Attorney, Agent, or Firm* — Birch, Stewart, Kolasch & Birch, LLP

(57) ABSTRACT

A correction and capture method for a biological particle capture device includes: providing an image observation unit facing a side of a carrier platform on an observation platform and orientating a view region of the image observation unit towards a carrier region of the carrier platform for taking images; performing a fixed point displacement on the observation platform by the image observation unit based on several observation basic coordinates on an observation platform coordinate system and defining a correction point in an image of the view region when the image observation unit is positioned at one observation basic coordinate and take the image; controlling a capture portion of the particle capture tool to enter the image of the view region; adjusting the capture portion to align with the correction point and recording a capture correction coordinate by the terminal device.

8 Claims, 15 Drawing Sheets

(56) References Cited

U.S. PATENT DOCUMENTS

| | | | |
|---|---|---|---|
| 2020/0150143 A1 | 5/2020 | Muschler et al. | |
| 2020/0348490 A1* | 11/2020 | Uchida | G03B 5/00 |
| 2023/0222646 A1* | 7/2023 | Anderson | H01L 22/12 |
| | | | 382/141 |

FOREIGN PATENT DOCUMENTS

| | | | | |
|---|---|---|---|---|
| EP | 3034602 A1 * | 6/2016 | | C12M 47/06 |
| TW | 202210973 A | 3/2022 | | |

OTHER PUBLICATIONS

Taiwanese Search Report for Taiwanese Application No. 112139779, dated Jul. 11, 2024, with English translation.

* cited by examiner

S1
Provide an image observation unit, which faces a side of a carrier platform, on an observation platform and orientate a view region of the image observation unit towards a carrier region of the carrier platform for taking images

S2
Perform a fixed point displacement on the observation platform by the image observation unit based on a plurality of observation basic coordinates set on an observation platform coordinate system and define a correction point in an image of the view region when the image observation unit is positioned at one of the observation basic coordinates and takes the image

S3
Control, by a terminal device, a particle capture tool on a capture platform to move relative to the carrier region on another side of the carrier platform based on a relative position of the image observation unit positioned at the observation basic coordinate of the observation basic coordinates, wherein a capture portion of the particle capture tool enters the image of the view region

S4
Adjust the capture portion of the particle capture tool to align with the correction point and record, by the terminal device, a capture correction coordinate of the capture portion located in a capture platform coordinate system of the capture platform

Dispose a first image correction unit and at least one second image correction unit on the carrier platform to take images, wherein a first magnification ratio of the first image correction unit is less than a second magnification ratio of the at least one second image correction unit, and an image-capture region of the first image correction unit overlaps with an image-capture region of the at least one second image correction unit

S6

Control the particle capture tool to move relative to the first image correction unit and the at least one second image correction unit and drive the capture portion of the particle capture tool to enter the image-capture region of the first image correction unit and the image-capture region of the at least one second image correction unit

FIG.2

S7
Place a carrier in the carrier region; when the image observation unit discovers a particle on the carrier, take, by the terminal device, the plurality of observation basic coordinates previously recorded in the observation platform coordinate system in correspondence with a periphery of the particle and calculate, by the terminal device, a position of the image observation unit located at the correction point recorded in each of the observation basic coordinates, so that the terminal device acquires a plurality of correction basic coordinates around the particle on the carrier

S8
Simulate, by the terminal device, a virtual correction region in the view region of the image observation unit based on the correction basic coordinates, wherein a position of the particle correspondingly falls into the virtual correction region

S9
Simulate a first extension axis and a second extension axis based on the position of the particle by the terminal device, wherein the first extension axis and a first absolute X coordinate axis in the virtual correction region perpendicularly intersect to acquire a first joint X coordinate; the first extension axis and a second absolute X coordinate axis in the virtual correction region perpendicularly intersect to acquire a second joint X coordinate; the second extension axis and a first absolute Y coordinate axis in the virtual correction region perpendicularly intersect to acquire a first joint Y coordinate; the second extension axis and a second absolute Y coordinate axis in the virtual correction region perpendicularly intersect to acquire a second joint Y coordinate

S10
Control the particle capture tool to correspondingly move to the position of the particle, wherein the terminal device takes the first joint X coordinate, the second joint X coordinate, the first joint Y coordinate, and the second joint Y coordinate, and uses a specific conditional formula to obtain a relative capture coordinate that the particle capture tool is required to correspondingly move

FIG.3

CORRECTION AND CAPTURE METHOD FOR BIOLOGICAL PARTICLE CAPTURE DEVICE

BACKGROUND OF THE INVENTION

Technical Field

The present invention relates generally to a correction and capture technology of capture devices, and more particularly to a correction and capture method for a biological particle capture device.

Description of Related Art

With the advancement of biomedical detection technology, nowadays biomedical detection technology generally uses an automatic capture device to automatically sort specific biological particles in Petri dishes to enhance the accuracy of detection.

Specifically, the automatic capture device has a mechanical arm that could drive a pipette tip to move, wherein the pipette tip is used to sort the specific biological particles in the Petri dishes. However, in practice, due to a tolerance between the mechanical arm and the pipette tip, a relative position of the mechanical arm and the pipette tip is deviated. Moreover, a relative position of the pipette tip and the Petri dishes might has a slight deviation, so that the mechanical arm could not accurately move the pipette tip to a correct position during a sorting process. As a result, the automatic capture device is likely to have a lower accuracy in the sorting process of the biological particles.

Accordingly, there is a need for a correction and capture method for a biological particle capture device to address a longstanding technical problem in traditional detection methods.

BRIEF SUMMARY OF THE INVENTION

In view of the above, the primary objective of the present invention is to provide a correction and capture method for a biological particle capture device, which could improve the accuracy of a particle capture tool in capturing biological particles by using multi-point correction.

In order to achieve the above objective, the present invention provides a correction and capture method for a biological particle capture device, including: providing an image observation unit, which faces a side of a carrier platform on an observation platform and orientating a view region of the image observation unit towards a carrier region of the carrier platform for taking images; performing a fixed point displacement on the observation platform by the image observation unit based on a plurality of observation basic coordinates set on an observation platform coordinate system and defining a correction point in an image of the view region when the image observation unit is positioned at one of the plurality of observation basic coordinates and take the image; controlling, by a terminal device, a particle capture tool on a capture platform to move relative to the carrier region on another side of the carrier platform based on a relative position of the image observation unit positioned at one of the plurality of observation basic coordinates, wherein a capture portion of the particle capture tool enters the image of the view region; and adjusting the capture portion of the particle capture tool to align with the correction point and recording, by the terminal device, a capture correction coordinate of the capture portion located in a capture platform coordinate system of the capture platform.

In one embodiment, the terminal device simulates an absolute X coordinate axis and an absolute Y coordinate axis in the view region; the absolute X coordinate axis and the absolute Y coordinate axis intersect perpendicularly at a focal center of the view region to form the correction point.

In one embodiment, the view region generated by the image observation unit located in one of the plurality of observation basic coordinates and the view region generated by the image observation unit after the image observation unit is shifted to an adjacent observation basic coordinate of the plurality of observation basic coordinates are partially overlapped.

In one embodiment, a distance between adjacent two observation basic coordinates of the plurality of observation basic coordinates on the observation platform coordinate system is set between 1 mm and 7 mm.

In one embodiment, a carrier is provided on the carrier region; a transparent bottom of the carrier faces the observation platform, and a camera path of the image observation unit penetrates the carrier from the transparent bottom.

In one embodiment, the carrier is filled with a transparent liquid, and a light of the camera path of the image observation unit is projected on the transparent bottom of the carrier from a bottom of the transparent bottom and penetrates the transparent liquid.

In one embodiment, the image observation unit includes a charge-coupled device (CCD), a complementary metal-oxide-semiconductor device (CMOS), or a combination thereof.

In one embodiment, the image observation unit uses a magnification ratio of 5 times to 100 times, and the image observation unit is controlled by the terminal device to move.

In one embodiment, when the terminal device records the capture correction coordinate of the capture portion, the image observation unit is then controlled to shift to a position of another observation basic coordinate of the plurality of observation basic coordinates on the observation platform; the terminal device defines another correction point in another image of the view region generated by the image observation unit and controls the capture portion of the particle capture tool to enter the another image of the view region generated by the image observation unit according to the position of the another observation basic coordinate of the plurality of observation basic coordinates; the terminal device then controls the capture portion of the particle capture tool to align with the another correction point in the view region generated by the image observation unit, and the terminal device correspondingly records another capture correction coordinate of the capture portion.

With the aforementioned design, the image observation unit faces the carrier platform to take an image, and the image observation unit performs the fixed point displacement on the observation platform corresponding to each of the observation basic coordinates. The terminal device defines the correction point based on the image of the view region of the image observation unit, controls the capture portion of the particle capture tool to enter the view region of the image observation unit, adjusts the capture portion of the particle capture tool to align with the correction point, and records the capture correction coordinate of the capture portion. In this way, the image observation unit on the observation platform and the particle capture tool on the capture platform have completed the relative position correction, and the capture correction coordinates on the capture platform coordinate system are established, so that when a biological particle at a certain position on the carrier in the image is detected by the image observation unit, the capture portion could be quickly moved to the view region where the image observation unit could take the image, which reduces the deviation of the relative position between the particle capture tool and the carrier and improves the accuracy of the particle capture tool in capturing the biological particles.

BRIEF DESCRIPTION OF THE SEVERAL VIEWS OF THE DRAWINGS

The present invention will be best understood by referring to the following detailed description of some illustrative embodiments in conjunction with the accompanying drawings, in which FIG. 1 is a flowchart of Steps S1~S4 of the correction and capture method for the biological particle capture device according to an embodiment of the present invention;

FIG. 2 is a flowchart of Steps S5~S6 of the correction and capture method for the biological particle capture device according to the embodiment of the present invention;

FIG. 3 is a flowchart of Steps S7~S10 of the correction and capture method for the biological particle capture device according to the embodiment of the present invention;

DETAILED DESCRIPTION OF THE INVENTION

A correction and capture method for a biological particle capture device according to an embodiment of the present invention is illustrated in FIG. 1 to FIG. 4, wherein the biological particle capture device includes a carrier platform 10, an observation platform 20, a capture platform 30, and a terminal device 40.

Figure 4:
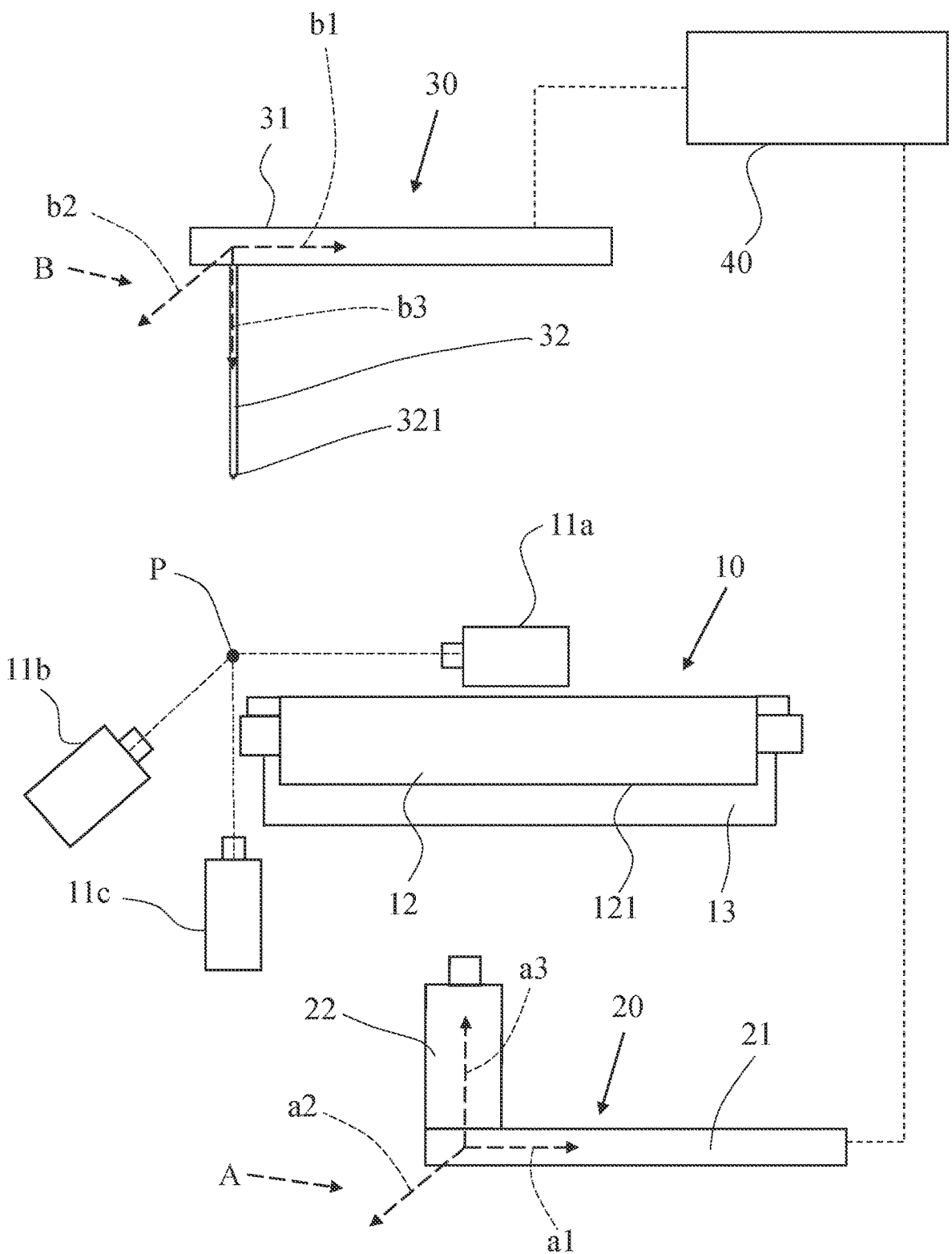
FIG. 4 is a schematic view of the biological particle capture device according to the embodiment of the present invention.

The carrier platform 10 is provided with a first image correction unit 11a and a plurality of second image correction units. The first image correction unit 11a and the plurality of second image correction units respectively include a charge-coupled device (CCD), a complementary metal-oxide-semiconductor device (CMOS), or a combination thereof. In the current embodiment, the plurality of second image correction units includes two second image correction units 11b, 11c as an example. In the current embodiment, the first image correction unit 11a and the two second image correction units 11b, 11c are respectively set up on the carrier platform 10 by a support (not shown) for taking images. Referring to FIG. 4, the first image correction unit 11a and one of the second image correction units 11b are on a same horizontal datum plane (not shown) and are located above carrier platform 10, wherein the horizontal datum plane faces the carrier platform 10. The other second image correction unit 11c faces the horizontal datum plane for taking images, wherein a camera axis of the other second image correction unit 11c is perpendicular to a camera axis of the first image correction unit 11a and a camera axis of the second image correction unit 11b. Specifically, the camera axis of the first image correction unit 11a and the camera axis of the second image correction unit 11b are equivalent to an X-axis direction of the horizontal datum plane and a Y-axis direction of the horizontal datum plane, and the camera axis of the other second image correction unit 11c, which is perpendicular to the camera axis of the first image correction unit 11a and the camera axis of the second image correction unit 11b, is equivalent to a Z-axis direction of the horizontal datum plane. However, the positions and the structures of the first image correction unit 11a and the second image correction units 11b, 11c are not limited to the aforementioned, as long as the first image correction unit 11a and the second image correction units 11b, 11c could be set up on the carrier platform 10. For example, in other embodiments, only one second image correction unit 11b and the first image correction unit 11a could be disposed on the horizontal datum plane.

Figure 9:
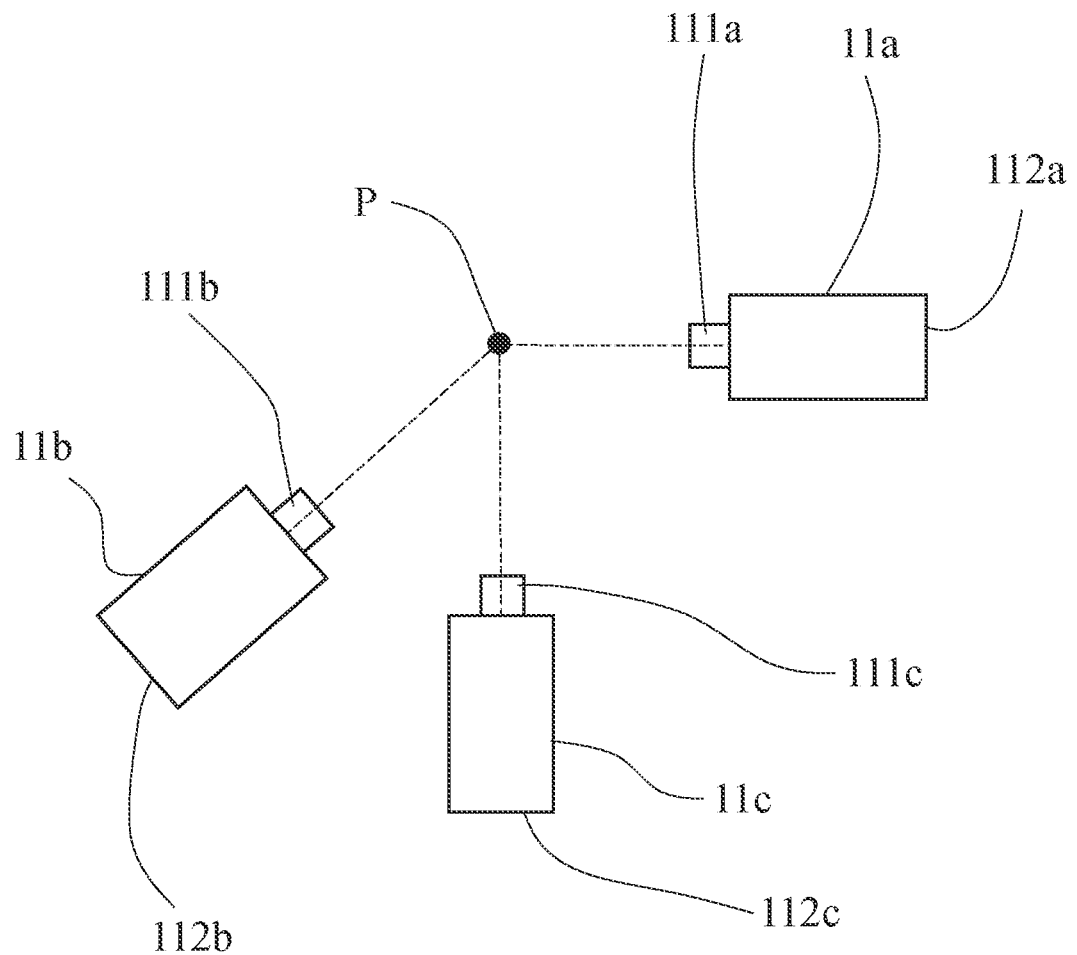
FIG. 9 is a schematic view of the structure of the first image correction unit and the second image correction units on the carrier platform of the correction and capture method for the biological particle capture device according to the embodiment of the present invention.

In addition, referring to FIG. 9, a receiving end 111a of the first image correction unit 11a, a receiving end 111b of the second image correction unit 11b, and a receiving end 111c of the other second image correction unit 11c are disposed adjacent to one another. A tail end 112a of the first image correction unit 11a is opposite to the receiving end 111a of the first image correction unit 11a to be located at the other end of the first image correction unit 11a. A tail end 112b of the second image correction unit 11b is opposite to the receiving end 111b of the second image correction unit 11b to be located at the other end of the second image correction unit 11b. A tail end 112c of the other second image correction unit 11c is opposite to the receiving end 111c of the other second image correction unit 11c to be located at the other end of the other second image correction unit 11c. The camera axis of the first image correction unit 11a passes through the receiving end 111a and the tail end 112a of the first image correction unit 11a. The camera axis of the second image correction unit 11b passes through the receiving end 111b and the tail end 112b of the second image correction unit 11b. The camera axis of the other second image correction unit 11c passes through the receiving end 111c and the tail end 112c of the other second image correction unit 11c. An image-capture region of the first image correction unit 11a overlaps with an image-capture region of the second image correction unit 11b and an image-capture region of the other second image correction unit 11c.

The observation platform 20 is disposed on a side of the carrier platform 10. In the current embodiment, the observation platform 20 is located below the carrier platform 10, wherein the observation platform 20 is provided with a control device 21 and an image observation unit 22. The control device 21 is connected to the image observation unit 22 and could control the image observation unit 22 to translate or move at a predetermined angle relative to the carrier platform 10. The image observation unit 22 on the observation platform 20 is adapted to observe a biological particle on the carrier platform 10. The image observation unit 22 includes a charge-coupled device (CCD), a complementary metal-oxide-semiconductor device (CMOS), or a combination thereof.

However, a displacement relationship between the image observation unit 22 and the carrier platform 10 is not limited to the above description. For example, in other embodiments, the control device 21 is immobile and the carrier platform 10 is connected to a movement device 13 (as shown in FIG. 4), such that the carrier platform 10 could be driven by the movement device 13 to translate or move at an angle relative to the image observation unit 22. Alternately, in another embodiment, both the control device 21 and the carrier platform 10 are movable, that is, the carrier platform 10 and the image observation unit 22 could translate or move at an angle relative to each other. The angle could be 0 degree (horizontal), 90 degrees (vertical), or adjusted to any angles according to the requirements.

In addition, an observation platform coordinate system A is defined at the observation platform 20. The observation platform coordinate system A includes a first X axis a1, a first Y axis a2, and a first Z axis a3 that are perpendicular to one another. After the observation platform coordinate system A is established, any point coordinate of the observation platform coordinate system A could be defined as (Xa, Ya, Za). The observation platform 20 uses the control device 21 to drive the image observation unit 22 to move arbitrarily relative to the carrier platform 10 within an area covered by the observation platform 20 in accordance with the observation platform coordinate system A. A plurality of observation basic coordinates is provided on the observation platform coordinate system A, wherein the observation basic coordinates are position coordinates that are predetermined and correspond to the movement of the image observation unit 22 relative to the carrier platform 10, so that the image observation unit 22 could perform continuously fixed point displacement among the observation basic coordinates to thoroughly take images of the carrier platform 10.

The capture platform 30 is opposite to the observation platform 20 and is provided on the other side of the carrier platform 10. In the current embodiment, the capture platform 30 is located above the carrier platform 10. The capture platform 30 is provided with a mechanical arm 31 and a particle capture tool 32. Both the mechanical arm 31 and the control device 21 could be defined to include any mechanical devices capable of moving in a space without being limited in directions. As shown in FIG. 4, the mechanical arm 31 could drive the particle capture tool 32 to translate, vertically move, or move at an angle relative to the carrier platform 10, but not limited to thereto. In one embodiment, the mechanical arm 31 is immobile, but the carrier platform 10 is translated, vertically moved, or moved at an angle relative to the particle capture tool 32. In another embodiment, both the mechanical arm 31 and the carrier platform 10 are movable, that is, the carrier platform 10 and the particle capture tool 32 translate, vertically move, or move at an angle relative to each other. The angle could be 0 degree (horizontal), 90 degrees (vertical), or adjusted to any angle as required.

In addition, a capture platform coordinate system B is defined at the capture platform 30. The capture platform coordinate system B includes a second X axis b1, a second Y axis b2, and a second Z axis b3 that are perpendicular to one another. Any point coordinate of the capture platform coordinate system B could be defined as (Xb, Yb, Zb). The mechanical arm 31 on the capture platform 30 is driven by a driving device (not shown). The driving device could be an electric motor, a pneumatic cylinder, or other power devices. In this way, the particle capture tool 32 could be controlled by the mechanical arm 31 to move arbitrarily relative to the carrier platform 10 within an area covered by the capture platform 30 in accordance with the capture platform coordinate system B.

The terminal device 40 is electrically connected to the mechanical arm 31 of the capture platform 30 and the control device 21 of the observation platform 20 respectively. The terminal device 40 could respectively control the mechanical arm 31 and the control device 21 to move. The terminal device 40 is electrically connected to the first image correction unit 11a, the second image correction units 11b, 11c, and the image observation unit 22 and is adapted to acquire and analyze image signals.

Figure 5:
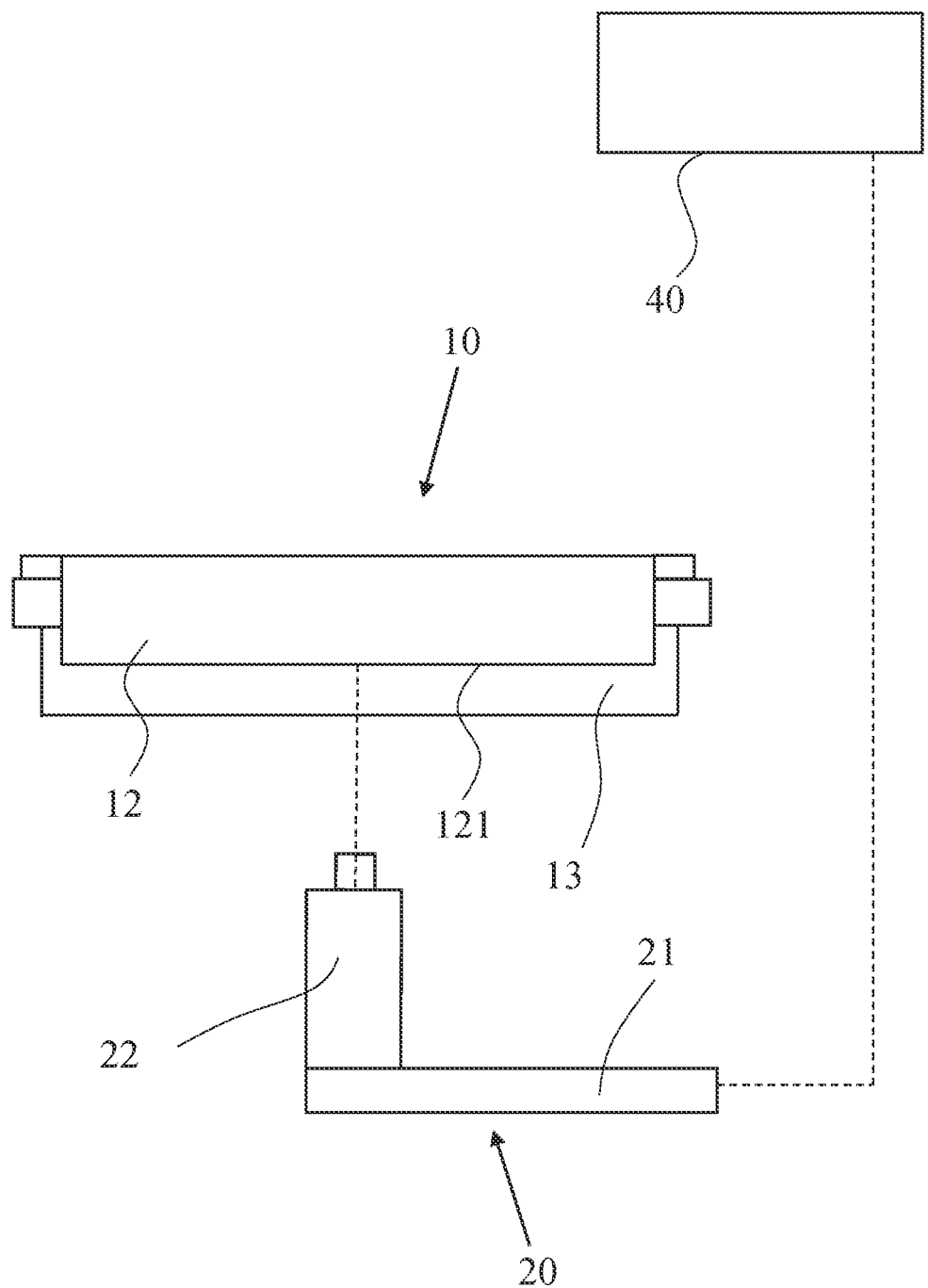
FIG. 5 is a schematic view of the biological particle capture device according to the embodiment of the present invention, showing the image observation unit projects towards the carrier.

Therefore, based on the aforementioned hardware structure, the correction and capture method for the biological particle capture device is further explained below and includes the following steps:

Step S1: as shown in FIG. 1, FIG. 4, and FIG. 5, the image observation unit 22 faces a carrier region of the carrier platform 10 on the observation platform 20. In the current embodiment, the carrier region holds a carrier 12 adapted to carry biological particles; the biological particles could include, but not limited to, cells, clump cells, bacteria, fungi, exosomes, liposomes; the cells could include, but not limited to, stem cells, cancer cells, germ cells, somatic cells, nerve cells, hemocytes, circulating tumor cells, red blood cells, white blood cells, and erythroblasts. A view region 221 of the image observation unit 22 faces the carrier region of the carrier platform 10 for taking images. The carrier 12 has a transparent bottom 121 which faces the observation platform 20. Because the carrier region of the carrier platform 10 and the transparent bottom 121 of the carrier 12 are transparent, a camera path of the image observation unit 22 penetrates the carrier platform 10 from the transparent bottom 121 of the carrier 12.

In addition, the image observation unit 22 could use a magnification ratio of 5 times to 100 times, wherein the magnification ratio of the image observation unit 22 could be adjusted according to demand. In the current embodiment, the image observation unit 22 is an objective with a magnification ratio of 10 times, so that a view of the transparent bottom 121 of the carrier 12 could be accurately imaged and detected by the high magnification ratio. In other embodiments, the carrier 12 could be filled with a transparent liquid 122, and a light of the camera path of the image observation unit 22 is projected on the transparent bottom 121 of the carrier 12 from a bottom of the transparent bottom and penetrates the transparent liquid 122 to simulate an actual situation that the carrier 12 has a nutrient fluid therein.

Step S2: the terminal device 40 controls the control device 21 of the observation platform 20 to drive the image observation unit 22 to move according to the observation basic coordinates predetermined on the observation platform coordinate system A, so that the image observation unit 22 performs the fixed point displacement on the observation platform 20 in correspondence with a position of the observation basic coordinates; the image observation unit 22 faces the transparent bottom 121 of the carrier 12 for taking an image and the image observation unit 22 transmits the image of the carrier 12 to the terminal device 40. In the current embodiment, a distance between two of the observation basic coordinates, which are adjacent, on the observation platform coordinate system A is set between 1 mm and 7 mm, wherein the distance between the two adjacent observation basic coordinates basically includes a distance of an X-axis coordinate value, a distance of a Y-axis coordinate value, or a distance of a Z-axis coordinate value; when a mechanical deviation occurs on the observation platform 20 during a mechanical operation and the observation platform 20 is in a non-horizontal condition, the distance between the two adjacent observation basic coordinates on the observation platform coordinate system A should take into account the distance of the Z-axis coordinate value. In the current embodiment, the distance between the two adjacent observation basic coordinates on the observation platform coordinate system A is set to be 1 mm; assuming that one of the observation basic coordinates is (1, 1, 0) on the observation platform coordinate system A, the two adjacent observation basic coordinate could be (2, 1, 0) or (1, 2, 0); the distance between the two adjacent observation basic coordinates on the observation platform coordinate system A is used for positioning and correction and could be adjusted according to demand. However, in the present invention, the distance between the two adjacent observation base coordinates does not constitute a limitation of the present invention. If the distance between the two adjacent observation basic coordinates is smaller, the time taken for correction is longer. In other embodiments, the distance between the two adjacent observation basic coordinates could also be set at 3 mm for faster correction.

Figure 6:
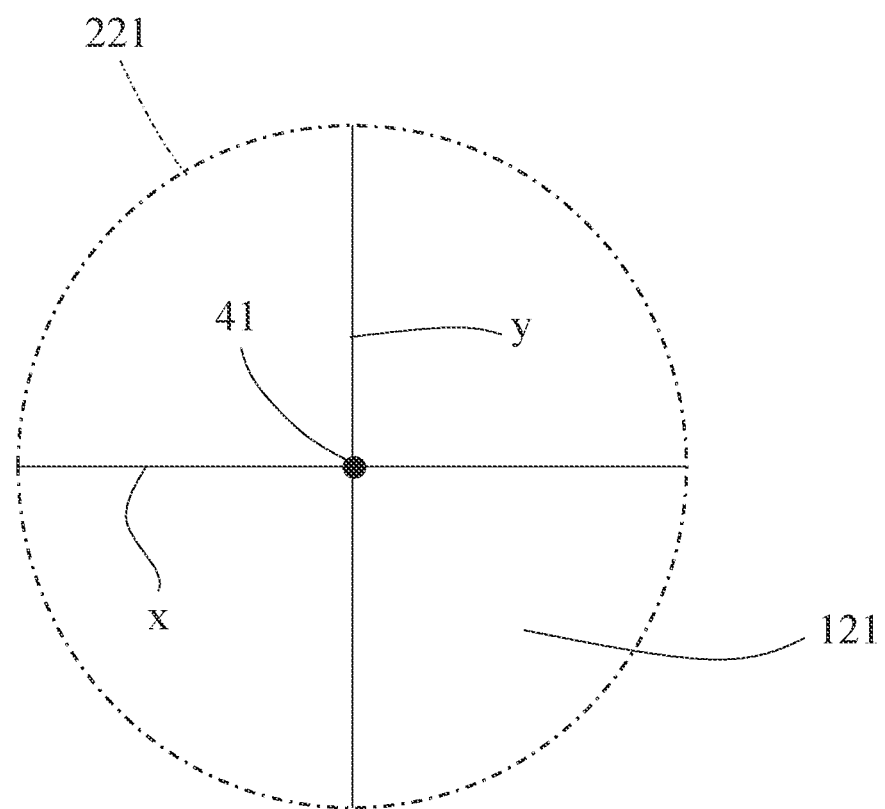
FIG. 6 is a schematic view of the correction and capture method for the biological particle capture device according to the embodiment of the present invention, showing the correction point is defined in the image of the view region of the image observation unit.

Furthermore, as shown in FIG. 5 and FIG. 6, when the image observation unit 22 moves to one of the observation basic coordinates, a correction point 41 is defined in an image of the view region 221. The terminal device 40 simulates an absolute X coordinate axis x and an absolute Y coordinate axis y in the view region 221, wherein the absolute X coordinate axis x and the absolute Y coordinate axis y intersect perpendicularly at a focal center of the view region 221 to form the correction point 41.

Figure 7:
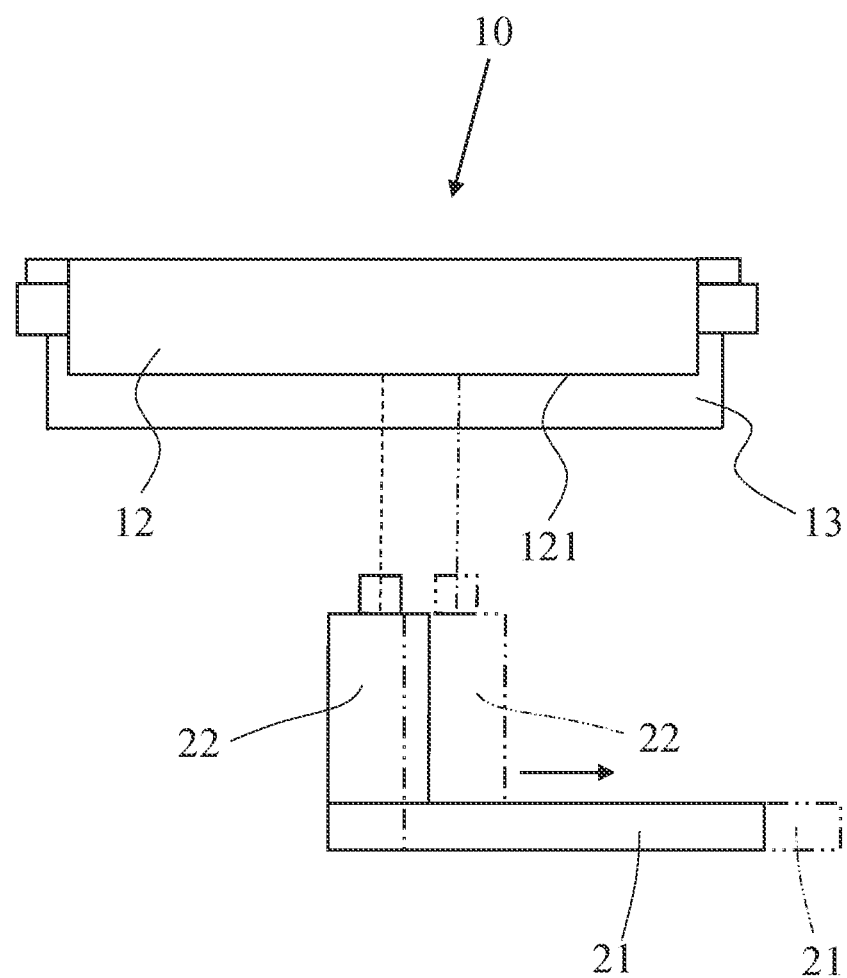
FIG. 7 is a schematic view of the correction and capture method for the biological particle capture device according to the embodiment of the present invention, showing the image observation unit performs the fixed point displacement corresponding to each of the observation basic coordinates.
Figure 8:
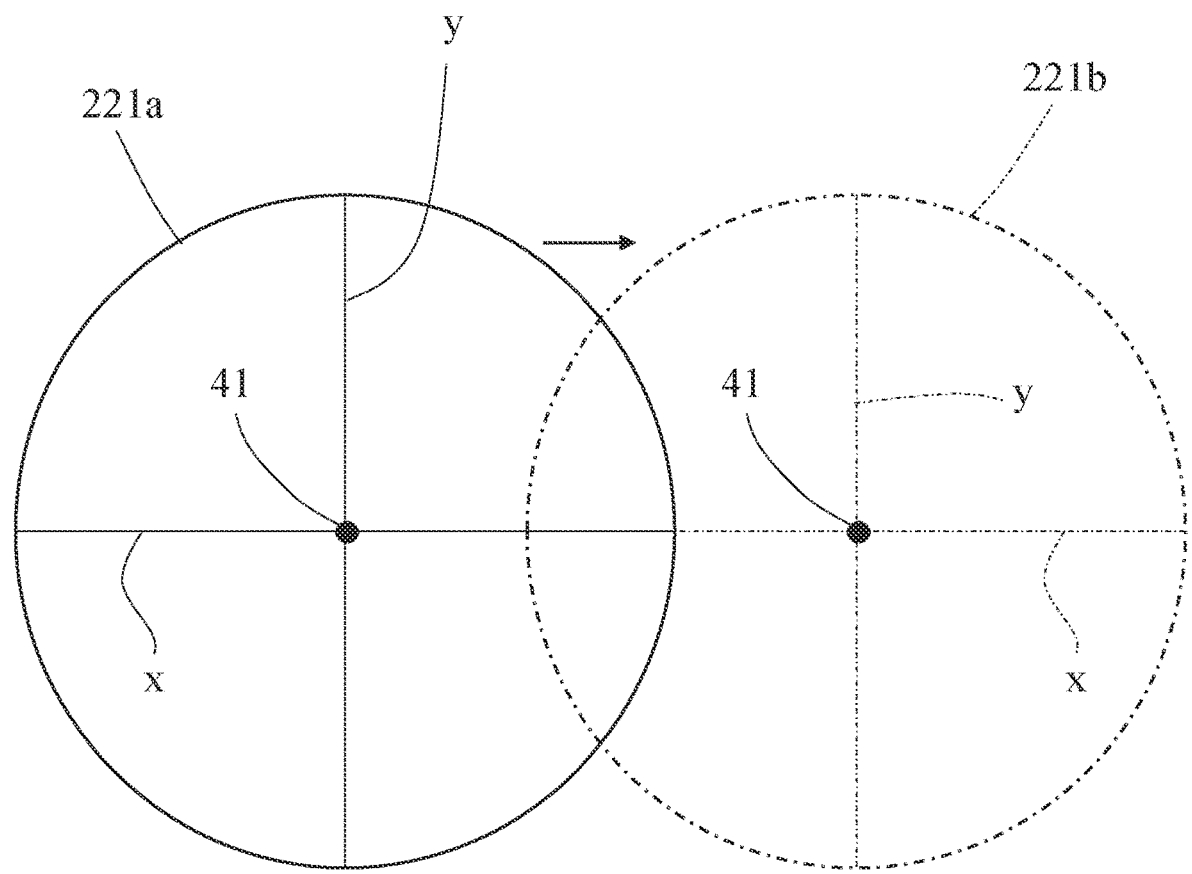
FIG. 8 is a schematic view of the correction and capture method for the biological particle capture device according to the embodiment of the present invention, showing the view region generated by the image observation unit located in one of the observation basic coordinates and the view region generated by the image observation unit after the image observation unit is shifted to the adjacent observation basic coordinate.

In addition, the view region 221 generated by the image observation unit 22 located in one of the observation basic coordinates and the view region 221 generated by the image observation unit 22 after the image observation unit 22 is shifted to one of the adjacent observation basic coordinates could be partially overlapped. Referring to FIG. 7 and FIG. 8, assuming that the image observation unit 22 is located at a position where the observation basic coordinate is (1, 1, 0) and the image observation unit 22 generates a view region 221a corresponding to the carrier platform 10, when the image observation unit 22 moves to a position where the observation basic coordinate is (2, 1, 0), the image observation unit 22 generates a view region 221b corresponding to the carrier platform 10; in this case, the view region 221a and the view region 221b could be partially overlapped.

Step S3: the terminal device 40 controls the particle capture tool 32 on the capture platform 30 to move above the carrier platform 10 and relative to the carrier region according to a relative position of the image observation unit 22 that is positioned at one of the observation basic coordinates, such that the capture portion 321 of the particle capture tool 32 is shifted on a surface of the carrier 12, and the capture portion 321 of the particle capture tool 32 enters the image of the view region 221 of the image observation unit 22; in this way, the image observation unit 22 could detect a relative position of the capture portion 321 of the particle capture tool 32 that is located in the view region 221. In particular, the capture portion 321 of the particle capture tool 32 could move regularly on the surface of the carrier 12 along a movement path. For example, the movement path of the particle capture tool 32 could start from a fixed center of the carrier 12 and move outward; the movement path could also repetitively move back and forth from left to right on the surface of the carrier 12; alternatively, the movement path of the particle capture tool 32 could be adjusted to move randomly with a non-repetitive trajectory, so that the capture portion 321 of the particle capture tool 32 finally enters into the image of the view region 221 of the image observation unit 22. In another embodiment, a moving position or an angle of the capture portion 321 of the particle capture tool 32 could be adjusted manually, so that the capture portion 321 of the particle capture tool 32 enters into the image of the view region 221 of the image observation unit 22.

Step S4: when the image observation unit 22 detects that the capture portion 321 of the particle capture tool 32 enters the view region 221, the terminal device 40 adjusts the capture portion 321 of the particle capture tool 32 to align with the correction point 41 in the view region 221. When the image observation unit 22 determines that the capture portion 321 of the particle capture tool 32 is indeed aligned with the correction point 41 in the view region 221, the terminal device 40 records a capture correction coordinate of the capture portion 321 of the particle capture tool 32 that is located in the capture platform coordinate system B of the capture platform 30. In other words, when the terminal device 40 records the capture correction coordinate of the capture portion 321 of the particle capture tool 32, the terminal device 40 then controls the image observation unit 22 to shift to a position of another one of the observation basic coordinates on the observation platform 20; the terminal device 40 defines another correction point 41 in another image of the view region 221 generated by the image observation unit 22 and controls the capture portion 321 of the particle capture tool 32 to enter the another image of the view region 221 generated by the image observation unit 22 according to the position of the another observation basic coordinate; the terminal device 40 then controls the capture portion 321 of the particle capture tool 32 to align with the another correction point 41 in the view region 221 generated by the image observation unit 22, and the terminal device 40 records another capture correction coordinate of the capture portion 321 of the particle capture tool 32.

The relative position correction of the image observation unit 22 on the observation platform 20 and the particle capture tool 32 on the capture platform 30 has already been completed on the carrier platform 10 and the capture correction coordinates have been established and recorded on the capture platform coordinate system B. In this way, when the image observation unit 22 detects the biological particles at a certain position on the carrier 12, the capture portion 321 could quickly reach the view region 221 that the image observation unit 22 could take images. After replacing the particle capture tool 32 due to operational requirements, an angle between the particle capture tool 32 and the mechanical arm 31 might not be the same every time when the particle capture tool 32 is connected to the mechanical arm 31; alternatively, when a deviation caused by the mechanical deviation occurs during the mechanical operation or due to a vibration of the hardware, a discrepancy exists between the position where the particle capture tool 32 reaches the predetermined capture correction coordinate and the position where the image observation unit 22 moves in correspondence with the capture correction coordinate; nevertheless, the discrepancy is still within the view region 221 that the image observation unit 22 could take images; therefore, in the current embodiment, the position correction between the particle capture tool 32 and the image observation unit 22 is achieved by performing steps S1 to S4, so that the discrepancy of the relative position between the particle capture tool 32 and the carrier 12 is reduced, and the accuracy of the particle capture tool 32 in capturing the biological particles is improved.

More specifically, the image observation unit 22 monitors the capture portion 321 from a bottom perspective. The terminal device 40 judges the position of the capture portion 321 relative to the correction point 41 in the view region 221 in accordance with the images taken by the image observation unit 22, and the terminal device 40 adjusts the position of the capture portion 321 on the carrier 12 by controlling the mechanical arm 31, so that an axis of the capture portion 321 is aligned with the correction point 41 to correct the position of the particle capture tool 32. A correction way of the capture portion 321 is to control the capture portion 321 to move along the second X axis b1 of the capture platform coordinate system B and to move along the second Y axis b2 of the capture platform coordinate system B, so that the axis or a tip of the capture portion 321 is aligned with the correction point 41. In other embodiments, when the capture portion 321 is non-polygon (e.g., circular or spherical, etc.), a center axis of the capture portion 321 is aligned with the correction point 41; at that time, a focus of the image observation unit 22 falls on the surface of the carrier 12, that is, the focus of the image observation unit 22 is located on a side of the transparent bottom 121 of the carrier 12 facing the particle capture tool 32.

In one embodiment, the focus of the image observation unit 22 might slightly adjusted to be away from the surface of the carrier 12, or the focus of the image observation unit 22 might just fall on the surface of the carrier 12, and the mechanical arm 31 repetitively moves the capture portion 321 along the second Z axis b3 of the capture platform coordinate system B in accordance with the control of the terminal device 40. When the image observation unit 22 looks up to monitor that an acutance of the capture portion 321 reaches the highest, the terminal device 40 judges that the capture portion 321 falls on the focus of the image observation unit 22, and the terminal device 40 defines a coordinate position of the capture portion 321 on the second Z axis b3 of the capture platform coordinate system B as a corrected position of the capture portion 321 in relation to the image observation unit 22; when the capture portion 321 actually falls on the correction point 41, the terminal device 40 defines a coordinate position of the capture portion 321 on the second X axis b1 and the second Y axis b2 of the capture platform coordinate system B as a corrected position of the capture portion 321 in relation to the correction point 41; finally, a correction information of the capture portion 321 in the capture platform coordinate system B is recorded by the terminal device 40.

The present invention is to control the image observation unit 22 in a predetermined sequence to perform the fixed point displacement on the observation platform 20 in correspondence with each of the observation basic coordinates; then the terminal device 40 controls the capture portion 321 of the particle capture tool 32 to move and align with the position of the correction point 41 in the image of the view region 221 in accordance with the relative position of the image observation unit 22 located at one of the observation basic coordinates, so that the terminal device 40 records a relative position relationship between the observation platform coordinate system A and the capture platform coordinate system B, and at the same time the terminal device 40 records a relative coordinate z that the mechanical arm 31 drives the capture portion 321 of the particle capture tool 32 to move to each of the correction points 41. In this way, by calculating the relative coordinates z between the correction point 41 and the capture portion 321 of the particle capture tool 32 relative to the capture platform coordinate system B, an absolute position of the correction points 41 and the relative coordinate z that the particle capture tool 32 is required to correspondingly move could be obtained.

Referring to FIG. 2, FIG. 4, and FIG. 9, in Step S5, a camera focus of the first image correction unit 11*a* on the carrier platform 10 overlaps with a camera focus of the second image correction unit 11*b* and a camera focus of the other second image correction unit 11*c* to form a positioning reference point P. In the current embodiment, the first image correction unit 11*a* receives an image signal through a first magnification ratio, and the second image correction units 11*b*, 11*c* receive an image signal through a second magnification ratio respectively. More specifically, a detailed relationship between the first image correction unit 11*a* and the second image correction units 11*b*, 11*c*. The first magnification ratio of the first image correction unit 11*a* is set less than the second magnification ratio of the second image correction units 11*b*, 11*c*, wherein the first magnification ratio used by the first image correction unit 11*a* is between 1.5 times and 5 times, and the second magnification ratio used by the second image correction units 11b, 11c is between 5 times and 20 times.

In the current embodiment, the first magnification ratio used by the first image correction unit 11a is 2 times, and the second magnification ratio used by the second image correction units 11b, 11c is 10 times. A purpose of the first magnification ratio used by the first image correction unit 11a being less than the second magnification ratio used by each of the second image correction units 11b, 11c is to enable the first image correction unit 11a to have a larger image-capture region during in a process of initially taking images. It should be noted that the magnification ratio of the first image correction unit 11a, the magnification ratio of the second image correction unit 11b, and the magnification ratio of the other second image correction unit 11c could be respectively adjusted according to the demand, that is, the first image correction unit 11a, the second image correction unit 11b, and the other second image correction unit 11c are not limited to have the above mentioned magnification ratios.

Step S6: referring to FIG. 2 to FIG. 4, the mechanical arm 31 controls the particle capture tool 32 to move relative to the first image correction unit 11a and the second image correction units 11b, 11c and drives the capture portion 321 of the particle capture tool 32 to enter the image-capture region of the first image correction unit 11a and the image-capture region of each of the second image correction units 11b, 11c. In the current embodiment, the mechanical arm 31 on the capture platform 30 is driven by the driving device (not shown), so that the mechanical arm 31 could drive the particle capture tool 32 to move arbitrarily relative to the first image correction unit 11a and the second image correction units 11b, 11c within the area covered by the capture platform 30 according to the capture platform coordinate system B.

When the particle capture tool 32 is actually activated and operated, the particle capture tool 32 is controlled to move to a position coordinate pre-set in the capture platform coordinate system B, wherein the position coordinate is pre-set to correspond to the positioning reference point P where the capture portion 321 of the capture tool 32 correspondingly falls onto and which is formed by the camera focus of the first image correction unit 11a overlapping with the camera focus of each of the second image correction units 11b, 11c. However, in other embodiments, when a position of the mechanism is deviated due to the human factors or machine vibration and hence the particle capture tool 32 is not parallel to the second Z axis b3 of the capture platform coordinate system B or the capture platform 30 could not maintain the horizontal due to other possible conditions, the axis of the particle capture tool 32 would be caused to be not perpendicular to the second X axis b1 of the capture platform coordinate system B and second Y axis b2 of the capture platform coordinate system B, so that the capture portion 321 would not fall exactly on the positioning reference point P, and thus a corresponding relationship between the position coordinate of the particle capture tool 32 driven by the capture platform 30 and an actual position of the capture portion 321 would be deviated; when the particle capture tool 32 is shifted to the position coordinate and the capture portion 321 is deviated from the positioning reference point P, at that time the terminal device 40 could determine a deviation distance between the capture portion 321 and the positioning reference point P of each of the images of the first image correction unit 11a and the second image correction units 11b, 11c and calculate the deviation distance to form a deviation compensation value, so that the terminal device 40 could correspondingly adjust the position coordinate of the particle capture tool 32 in accordance with the deviation compensation value. In one embodiment, the terminal device 40 controls the mechanical arm 31 to move the particle capture tool 32, so that the capture portion 321 of the particle capture tool 32 is aligned with the positioning reference point P.

Figure 10:
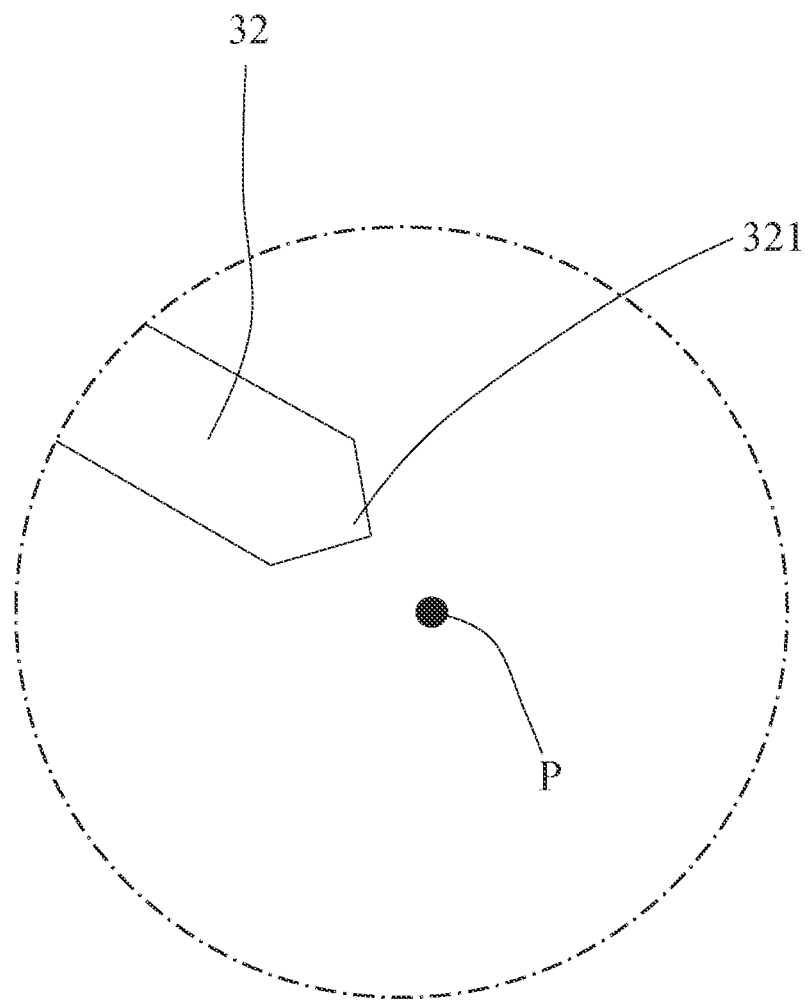
FIG. 10 is a schematic view of the image taken by the first image correction unit of the correction and capture method for the biological particle capture device according to the embodiment of the present invention, showing the capture portion of the particle capture tool does not fall onto the positioning reference point.

Referring to FIG. 10, for example, when the first image correction unit 11a detects that a deviation is generated between the capture portion 321 of the particle capture tool 32 and the positioning reference point P in the image-capture region of the first image correction unit 11a, the terminal device 40 calculates a deviation distance between the capture portion 321 and the positioning reference point P according to the image taken by the first image correction unit 11a, and a calculation result is used as a deviation compensation value of the particle capture tool 32 corresponding to the second X axis b1 of the capture platform coordinate system B; in other words, when the second image correction units 11b, 11c detect that a deviation is generated between the capture portion 321 of the particle capture tool 32 and the positioning reference point P in the image-capture regions of the second image correction units 11b, 11c, the terminal device 40 also calculates deviation distances corresponding to the images taken by the second image correction units 11b, 11c as a deviation compensation value of the particle capture tool 32 corresponding to the second Y axis b2 of the capture platform coordinate system B and a deviation compensation value of the particle capture tool 32 corresponding to the second Z axis b3 of the capture platform coordinate system B.

But in other embodiments, the particle capture tool 32 might also be adjusted respectively through the images of the first image correction unit 11a and the second image correction units 11b, 11c so that the capture portion 321 of the particle capture tool 32 is positioned at the positioning reference point P. Referring to FIG. 4 and FIG. 11A to FIG. 11C, the capture platform coordinate system B and the actual position of the capture portion 321 are corrected by firstly controlling the capture portion 321 of the particle capture tool 32 to enter the image-capture region of the first image correction unit 11a with the first magnification ratio, so that the image of the capture portion 321 of the particle capture tool 32 is initially taken with a wider field of view; then the capture portion 321 of the particle capture tool 32 is adjusted, by moving the mechanical arm 31, to be aligned with the camera focus of the first image correction unit 11a, and a lowest edge of the image of the capture portion 321 is located at a center of the field of view of the image-capture region of the first image correction unit 11a; then, the capture portion 321 of the particle capture tool 32 is controlled to enter the image-capture region of each of the second image correction units 11b, 11c with the second magnification ratio, and the second image correction units 11b, 11c take the image of the capture portion 321 of the particle capture tool 32 in detail with the second magnification ratio; the capture portion 321 is adjusted by the mechanical arm 31 to be aligned with the camera focus of each of the second image correction units 11b, 11c, so that a lowest edge of the images of the capture portion 321 is located at a center of the field of view of the image-capture region of each of the second image correction units 11b, 11c. Since the first magnification ratio of the first image correction unit 11a is less than the second magnification ratio of the second image correction units 11b, 11c, the first image correction unit 11a would have an effect of a larger field of view in the process of taking images. Therefore, the correction is performed by firstly using the first image correction unit 11a to take the image, so that the image to be corrected remains within the field of view when a large deviation is caused by human factors or mechanism displacements. Moreover, the field of view of the second image correction units 11b, 11c is smaller, so that if the second image correction units 11b, 11c are used as a basis for correction, the image to be corrected might be out of the field of view of the second image correction units 11b, 11c and hence the correction might not be performed accurately. In this way, the first image correction unit 11a is firstly used for initial correction, and then the second image correction units 11b, 11c are used to take the images for correction, thereby ensuring that a captured object to be corrected is within the field of view of the captured images.

Figure 11A:
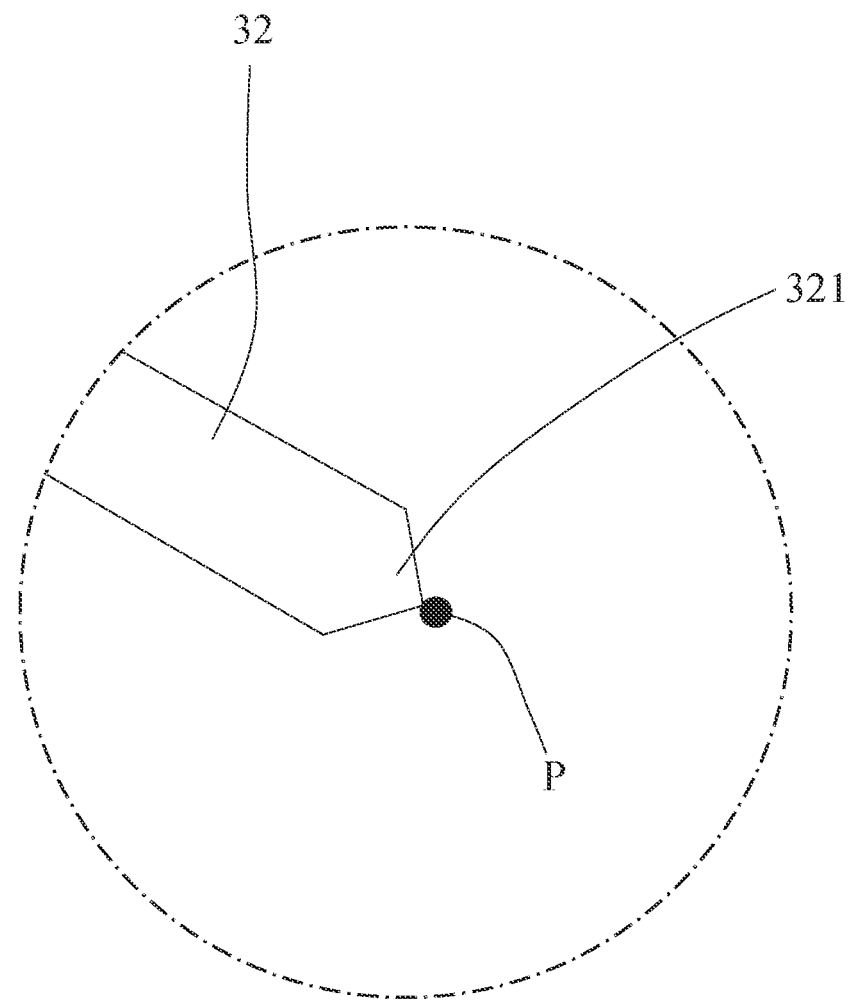
FIG. 11A is a schematic view of the image taken by the first image correction unit of the correction and capture method for the biological particle capture device according to the embodiment of the present invention, showing the capture portion of the particle capture tool is taken by the first image correction unit with the first magnification ratio.
Figure 11B:
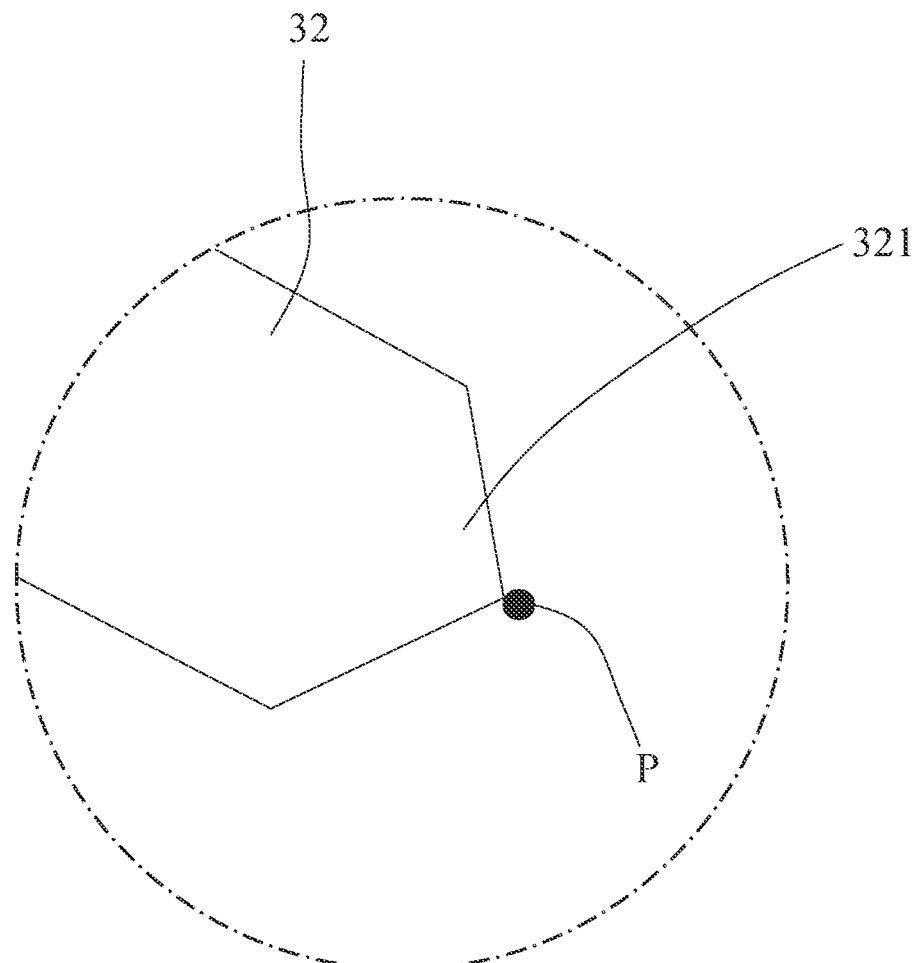
FIG. 11B is a schematic view of the image taken by one of the second image correction units of the correction and capture method for the biological particle capture device according to the embodiment of the present invention, showing the capture portion of the particle capture tool is taken by the second image correction unit with the second magnification ratio.
Figure 11C:
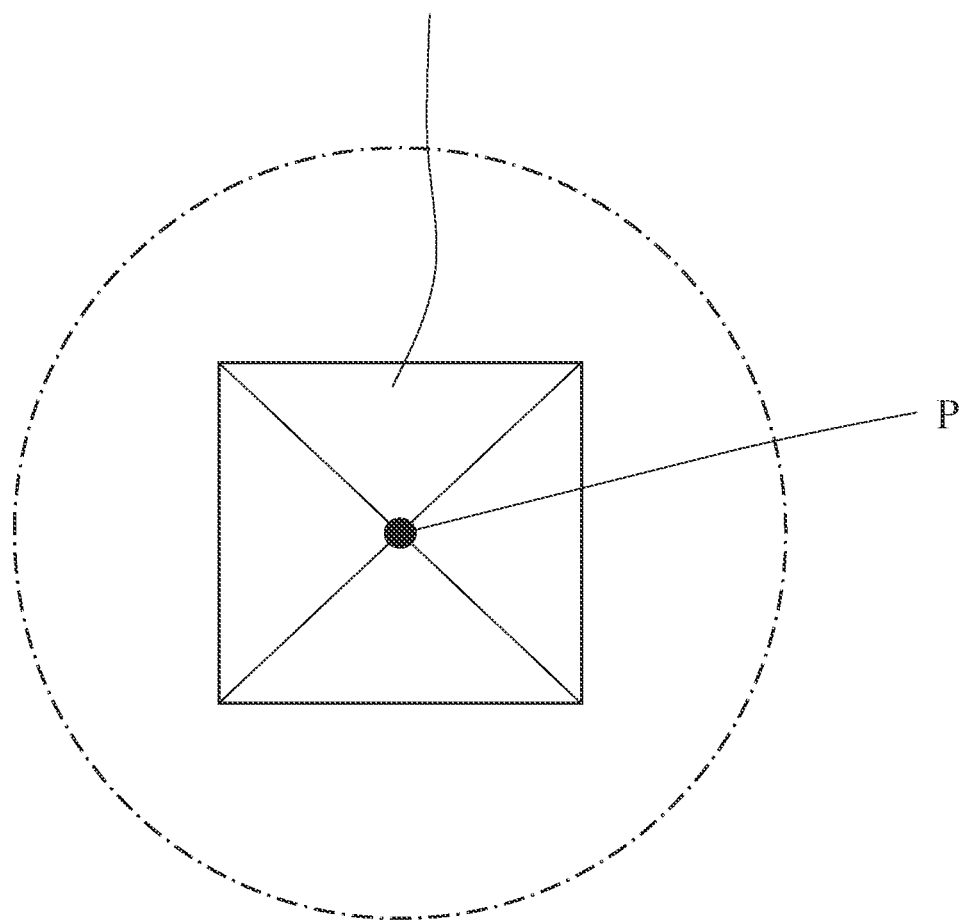
FIG. 11C is a schematic view of the image taken by the other second image correction unit of the correction and capture method for the biological particle capture device according to the embodiment of the present invention, showing the capture portion of the particle capture tool is taken by the other second image correction unit with the second magnification ratio.

The aforementioned correction for the capture platform coordinate system B and the actual position of the capture portion 321 is further described in the following. As shown in FIG. 11A, the first image correction unit 11a takes the image of the capture portion 321 of the particle capture tool 32 through the first magnification ratio, and the mechanical arm 31 is moved to make the lowest edge of the capture portion 321 located at the center of the field of view of the image-capture region of the first image correction unit 11a, and the acutance of the capture portion 321 is made to reach a maximum focus, so that the correction of the second X axis b1 of the capture platform coordinate system B is completed. Next, as shown in FIG. 11B, the second image correction unit 11b takes the image of the capture portion 321 of the particle capture tool 32 in detail with the second magnification ratio, and the mechanical arm 31 is controlled to drive the lowest edge side of the capture portion 321 to be located at the center of the field of view of the image-capture region of the second image correction unit 11b, and the acutance of the capture portion 321 is made to reach a maximum focus, so that the correction of the second Y axis b2 of the capture platform coordinate system B is completed. Then, as shown in FIG. 11C, the second image correction unit 11c takes the image of the capture portion 321 of the particle capture tool 32 in detail with the second magnification ratio, and the mechanical arm 31 is controlled to drive the capture portion 321 to be located at the center of the field of view of the image-capture region of the second image correction unit 11c, and the acutance of the capture portion 321 is made to reach a maximum focus, so that the correction of the second Z axis b3 of the capture platform coordinate system B is completed. The current embodiment is an illustrative example only and a sequence of correction between the second image correction unit 11b and the second image correction unit 11c does not result in any difference. By using the design of the first image correction unit 11a and the second image correction units 11b, 11c having different magnification ratios, the capture portion 321 of the particle capture tool 32 could be quickly and accurately corrected to position at the positioning reference point P. The capture portion 321 has the tip as shown in FIG. 11A, or a round end, a spherical end, or a shape in which a cross-section of a part of the capture portion 321 near a tail end is smaller than (or equal to) a cross-section of another part of the capture portion 321 away from the tail end.

In short, the mechanical arm 31 drives the capture portion 321 to shift, so that the capture portion 321 first falls onto the camera focus of the first image correction unit 11a, thereby causing the image of the capture portion 321 taken by the first image correction unit 11a to be located at the center and causing the acutance of the capture portion 321 to reach the maximum. The terminal device 40 records the coordinate position, which corresponds to the second X axis b1, of the capture portion 321 in the capture platform coordinate system B. By focusing the capture portion 321, an initial aligning and correction of the capture platform coordinate system B and the actual position of the capture portion 321 is completed.

Next, the second image correction unit 11b is used to take the image of the capture portion 321 in detail, i.e., the mechanical arm 31 is used to drive the capture portion 321 to shift, so that the capture portion 321 falls onto the camera focus of the second image correction unit 11b, thereby causing the image of the capture portion 321 taken by the second image correction unit 11b to be located at the center and causing the acutance of the capture portion 321 to reach the maximum. The terminal device 40 records the coordinate position, which corresponds to the second Y axis b2, of the capture portion 321 in the capture platform coordinate system B.

Then, the other second image correction unit 11c is used to take the image of the capture portion 321 in detail, i.e., the mechanical arm 31 is also used to drive the capture portion 321 to shift, so that the capture portion 321 falls onto the camera focus of the second image correction unit 11c, thereby causing the image of the capture portion 321 taken by the other second image correction unit 11c to be located at the center and causing the acutance of the capture portion 321 to reach the maximum. The terminal device 40 records the coordinate position of the capture portion 321 on the second X axis b1, the coordinate position the capture portion 321 on the second Y axis b2, and the coordinate position of the capture portion 321 on the second Z axis b3 in the capture platform coordinate system B. By focusing the capture portion 321 in detail, the correction of the capture platform coordinate system B and the actual position of capture portion 321 is completed to achieve a purpose of platform correction.

Hence, if when discrepancy occurs in the carrier platform 10 or the capture platform 30 of the biological particle capture device as a result of installation or other factors, regression, aligning, and correction could be completed at any time by using the correction way of the capture platform coordinate system B and the actual position of the capture portion 321 in the current embodiment. Furthermore, by the correction way of the capture platform coordinate system B and the actual position of the capture portion 321 in the current embodiment, when the particle capture tool 32 is replaced, the particle capture function would not be affected by the capture platform coordinate system B being not in correspondence with the actual position of the capture portion 321, which is caused by different thicknesses of different materials used or by a tolerance of the materials due to production, In the current embodiment, the terminal device 40 could also record a first spatial vector in the second X axis b1, a second spatial vector in the second Y axis b2, and a third spatial vector in the second Z axis b3 that the particle capture tool 32 moves in the capture platform coordinate system B.

In one embodiment, the capture platform coordinate system B correspondingly moves to an area where the first image correction unit 11a and the second image correction units 11b, 11c could take the images by the mechanical arm 31 driving the capture portion 321 of the particle capture tool 32; in other words, the relative position between the mechanical arm 31 and the particle capture tool 32 could be corrected when the capture portion 321 falls on the positioning reference point P.

In other embodiments, Step S5 and Step S6 could be adjusted as needed to precede the aforementioned Step S1, that is, a positional relationship between the capture portion 321 of the particle capture tool 32 and the positioning reference point P of the first image correction unit 11a and the second image correction units 11b, 11c could be adjusted first; a positional relationship between the capture portion 321 of the particle capture tool 32 and the image observation unit 22 would be corrected later.

Figure 12:
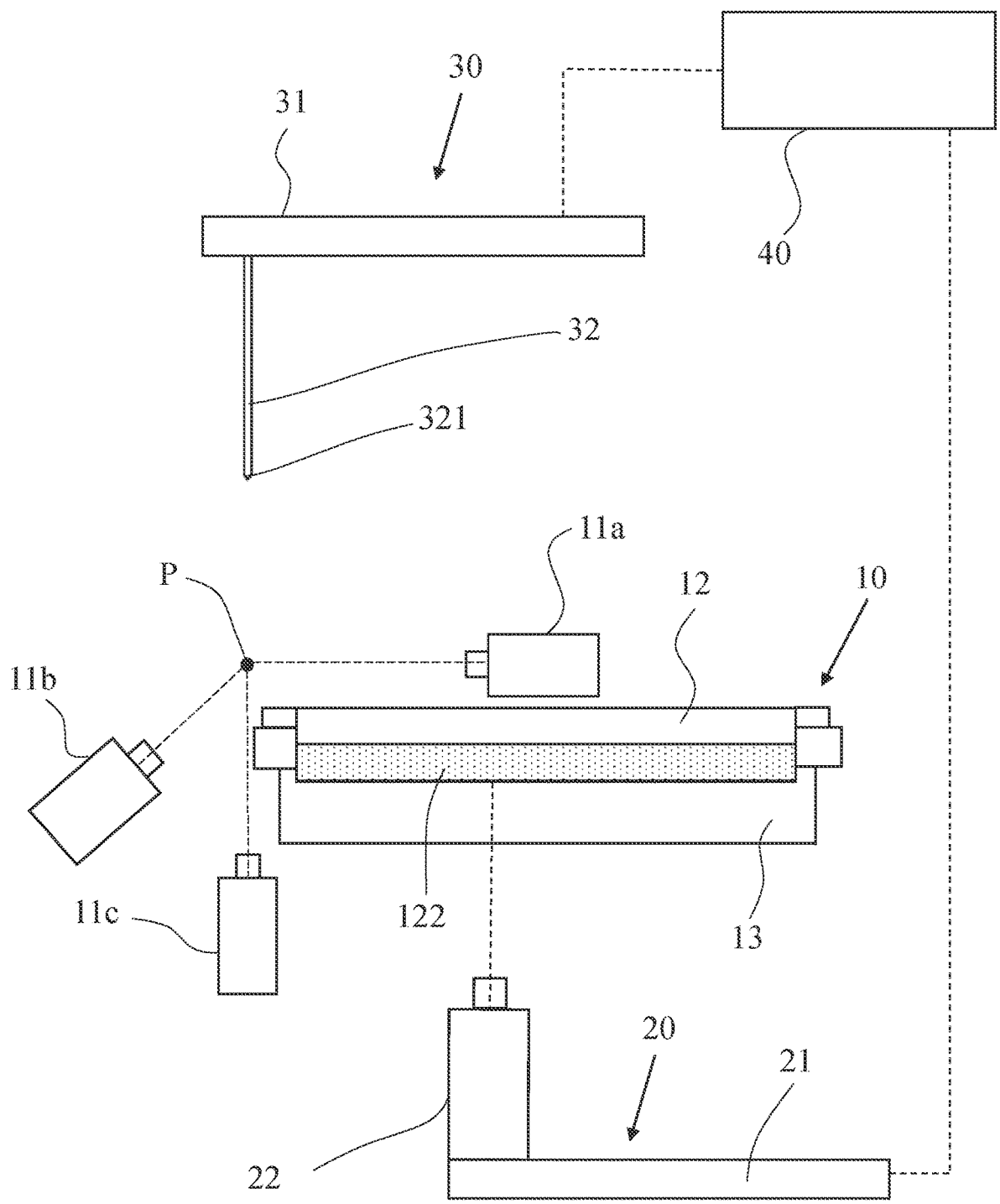
FIG. 12 is a schematic view of the carrier filled with the transparent liquid of the correction and capture method for the biological particle capture device according to another embodiment of the present invention.
Figure 13:
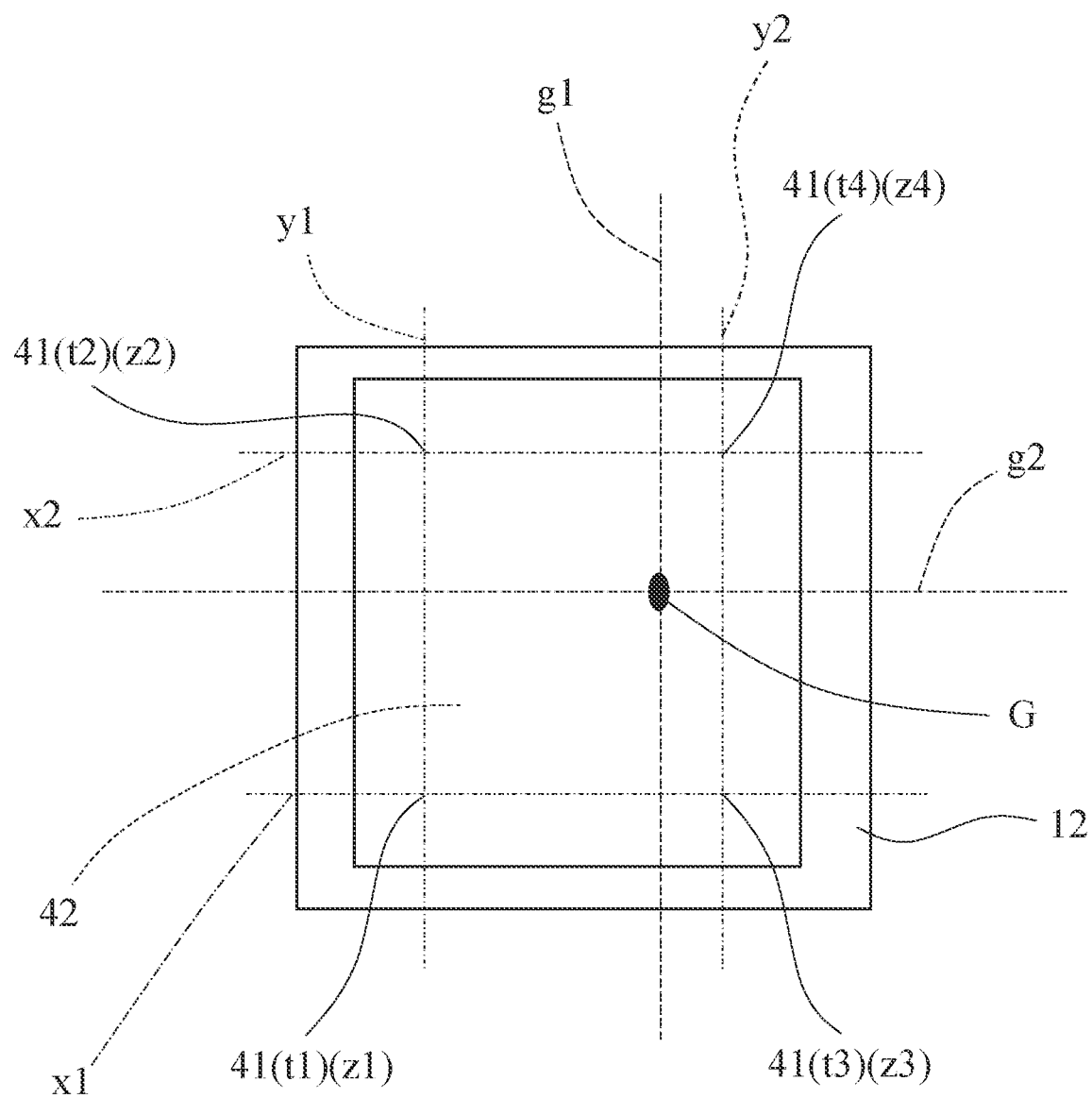
FIG. 13 is a schematic view of the correction and capture method for the biological particle capture device according to the embodiment of the present invention, showing the terminal device simulates the relative position of the biological particle in the carrier.

Referring to FIG. 3, FIG. 12, and FIG. 13, in Step S7, when the image observation unit 22 discovers a particle G on the carrier 12, the terminal device 40 takes the plurality of observation basic coordinates previously recorded in the observation platform coordinate system A in correspondence with a periphery of the particle G and calculates a position of the image observation unit 22 located at the correction point 41 recorded in each of the observation basic coordinates, so that the terminal device 40 acquires a plurality of correction basic coordinates t1~t4 around the particle G on the carrier 12.

Step S8: the terminal device 40 simulates a virtual correction region 42 in the view region of the image observation unit 22 based on the correction basic coordinates t1~t4, wherein a position of the particle G correspondingly falls into the virtual correction region 42. Referring to FIG. 13, more specifically, a first absolute X coordinate axis x1, a second absolute X coordinate axis x2, a first absolute Y coordinate axis y1, and a second absolute Y coordinate axis y2 are simulated in the view region 221 of the image observation unit 22 to enclose and form the virtual correction region 42, and the position of the particle G correspondingly falls into the virtual correction region 42, wherein the correction basic coordinates t1~t4 are respectively located at corners of the virtual correction region 42. The correction basic coordinates t1~t4 include a first correction basic coordinate t1, a second correction basic coordinate t2, a third correction basic coordinate t3, and a fourth correction basic coordinate t4. The first correction basic coordinate t1 corresponds to an intersection of the first absolute X coordinate axis x1 and the first absolute Y coordinate axis y1. The second correction basic coordinate t2 corresponds to an intersection of the second absolute X coordinate axis x2 and the first absolute Y coordinate axis y1. The third correction basic coordinate t3 corresponds to an intersection of the first absolute X coordinate axis x1 and the second absolute Y coordinate axis y2. The fourth correction basic coordinate t4 corresponds to an intersection of the second absolute X coordinate axis x2 and the second absolute Y coordinate axis y2.

Step S9: the terminal device 40 simulates a first extension axis g1 and a second extension axis g2 based on the position of the particle G, wherein the first extension axis g1 and the first absolute X coordinate axis x1 in the virtual correction region 42 perpendicularly intersect to acquire a first joint X coordinate; the first extension axis g1 and the second absolute X coordinate axis x2 in the virtual correction region 42 perpendicularly intersect to acquire a second joint X coordinate; the second extension axis g2 and the first absolute Y coordinate axis y1 in the virtual correction region 42 perpendicularly intersect to acquire a first joint Y coordinate; the second extension axis g2 and the second absolute Y coordinate axis y2 in the virtual correction region 42 perpendicularly intersect to acquire a second joint Y coordinate.

Step S10: the mechanical arm 31 is controlled to drive the particle capture tool 32 to correspondingly move to the position of the particle G, wherein the terminal device 40 takes the first joint X coordinate, the second joint X coordinate, the first joint Y coordinate, and the second joint Y coordinate, and uses a specific conditional formula to obtain a relative capture coordinate (Px,Py) that the particle capture tool 32 is required to correspondingly move. The specific conditional formula is as follows:

Calculation of Px Coordinate Value:

$$((x2-x)/(x2-x1))*Px11 + ((x-x1)/(x2-x1))*Px21 = Px1;$$
$$((x2-x)/(x2-x1))*Px12 + ((x-x1)/(x2-x1))*Px22 = Px2;$$
$$((y2-y)/(y2-y1))*Px1 + ((y-y1)/(y2-y1))*Px2 = Px;$$

Calculation of Py Coordinate Value:

$$((x2-x)/(x2-x1))*Py11 + ((x-x1)/(x2-x1))*Py21 = Py1;$$
$$((x2-x)/(x2-x1))*Py12 + ((x-x1)/(x2-x1))*Py22 = Py2;$$
$$((y2-y)/(y2-y1))*Py1 + ((y-y1)/(y2-y1))*Py2 = Py;$$

The denotations in the above mentioned conditional formula are as follows:
x1 is a X coordinate value of the first joint X coordinate in the first absolute X coordinate axis x1;
x2 is a X coordinate value of the second joint X coordinate in the second absolute X coordinate axis x2;
x is the X-axis coordinate value of the particle G in the observation platform coordinate system A;
y1 is a Y coordinate value of the first joint Y coordinate in the first absolute Y coordinate axis y1;
y2 is a Y coordinate value of the second joint Y coordinate in the second absolute Y coordinate axis y2;
y is the Y-axis coordinate value of the particle G in the observation platform coordinate system A;
Px11 is an X-axis relative coordinate value z1 of the capture platform coordinate system B corresponding to the first correction basic coordinate t1;
Px12 is an X-axis relative coordinate value z2 of the capture platform coordinate system B corresponding to the second correction basic coordinate t2;
Px21 is an X-axis relative coordinate value z3 of the capture platform coordinate system B corresponding to the third correction basic coordinate t3;
Px22 is an X-axis relative coordinate value z4 of the capture platform coordinate system B corresponding to the fourth correction basic coordinate t4;
Px1 is a first X-axis relative capture coordinate of the capture platform coordinate system B corresponding to the first joint X coordinate;
Px2 is a second X-axis relative capture coordinate of the capture platform coordinate system B corresponding to the second joint X coordinate;
Py11 is a Y-axis relative coordinate value z1 of the capture platform coordinate system B corresponding to the first correction basic coordinate t1;
Py12 is a Y-axis relative coordinate value z2 of the capture platform coordinate system B corresponding to the second correction basic coordinate t2;
Py21 is a Y-axis relative coordinate value z3 of the capture platform coordinate system B corresponding to the third correction basic coordinate t3;
Py22 is a Y-axis relative coordinate value z4 of the capture platform coordinate system B corresponding to the fourth correction basic coordinate t4;

Py1 is a first Y-axis relative capture coordinate of the capture platform coordinate system B corresponding to the first joint Y coordinate;

Py2 is a second Y-axis relative capture coordinate of the capture platform coordinate system B corresponding to the second joint Y coordinate;

Px is the X coordinate value of the relative capture coordinate corresponding to the position of the particle G;

Py is the Y coordinate value of the relative capture coordinate corresponding to the position of the particle G.

For example, when the image observation unit 22 discovers a particle G in the virtual correction region 42 of the carrier 12, each of the correction points 41 of the virtual correction region 42 at the corresponding correction basic coordinates t1~t4 and the capture portion 321 relatively located at the relative coordinates z1~z4 of the capture platform coordinate system B are recorded in the terminal device 40 as shown in the table below:

| Correction basic coordinates on the carrier | Relative coordinates of the capture platform coordinate system B |
|---|---|
| t1(10, 10) | z1(31, 28) |
| t2(10, 20) | z2(32, 39) |
| t3(20, 10) | z3(41, 29) |
| t4(20, 20) | z4(42, 40) |

In addition, the position of the particle G in the virtual correction region 42, i.e., a coordinate value (x,y) of the particle G on the carrier 12, calculated through simulating the first extension axis g1 and the second extension axis g2 is (16,18), so that the Px coordinate value and the Py coordinate value could be calculated by using the above mentioned conditional formula as follows:

Calculation of Px Coordinate Value:

$$Px1 = ((x2-x)/(x2-x1))*Px11 + ((x-x1)/(x2-x1))*Px21 =$$
$$((20-16)/(20-10))*31 + ((16-10)/(20-10))*41 = 37;$$
$$Px2 = ((x2-x)/(x2-x1))*Px12 + ((x-x1)/(x2-x1))*Px22 =$$
$$((20-16)/(20-10))*32 + ((16-10)/(20-10))*42 = 38;$$
$$Px = ((y2-y)/(y2-y1))*Px1 + ((y-y1)/(y2-y1))*Px2 =$$
$$((20-18)/(20-10))*37 + ((18-10)/(20-10))*38 = 37.8;$$

Calculation of Py Coordinate Value:

$$Py1 = ((x2-x)/(x2-x1))*Py11 + ((x-x1)/(x2-x1))*Py21 =$$
$$((20-16)/(20-10))*28 + ((16-10)/(20-10))*29 = 28.6;$$
$$Py2 = ((x2-x)/(x2-x1))*Py12 + ((x-x1)/(x2-x1))*Py22 =$$
$$((20-16)/(20-10))*39 + ((16-10)/(20-10))*40 = 39.6;$$
$$Py = ((y2-y)/(y2-y1))*Py1 + ((y-y1)/(y2-y1))*Py2 =$$
$$((20-18)/(20-10))*28.6 + ((18-10)/(20-10))*39.6 = 37.4;$$

In this way, the terminal device 40 could drive the mechanical arm 31 to move the particle capture tool 32 to the relative capture coordinate (37.8,37.4) of the capture platform coordinate system B to capture the particle G at the correction basic coordinate (x,y) of (16,18) through the (Px,Py) calculated by the above mentioned conditional formula.

In other words, in the present invention, the terminal device 40 records the correction basic coordinates t1~t4 of the carrier 12 and then takes the image through the image observation unit 22 to obtains the relative coordinates z1~z4 of the capture platform coordinate system B. The terminal device 40 could use the aforementioned conditional formula to calculate the relative capture coordinate (Px,Py) of the capture platform coordinate system B that is required to capture the particle G, and then the terminal device 40 accurately controls the mechanical arm 31 to drive the particle capture tool 32 to capture the particle G. It should be noted in particular that the current embodiment is illustrated with one virtual correction region 42 and four correction points 41 as an example, but not limited thereto. The more the virtual correction region 42 and the more the corresponding correction points 41 are provided, the more accurate the correction is, but the longer the correction time is. In order to ensure the correction accuracy and the time cost, the number of different virtual correction regions 42 and a spacing distance between the virtual correction regions 42 could be adjusted based on demand during each correction process to achieve the best correction result.

When the particle capture tool 32 has completed a particle capture operation, the mechanical arm 31 moves the particle capture tool 32 to a waste collection area (not shown) for disposal. The mechanical arm 31 is then moved to a capture tool area (not shown) to install a new particle capture tool 32, and Steps S1 to S4 are repeated for correction. More specifically, after the particle capture tool 32 has completed the particle capture operation and the mechanical arm 31 moves the particle capture tool 32 to the waste collection area (not shown) for disposal, the relative position between the observation platform coordinate system A and the capture platform coordinate system B remain unchanged, so that there is no need to carry out the corrections of steps S3 to S4 again.

With the design of the present invention, the image observation unit 22 faces the carrier platform 10 to take the image, and the image observation unit 22 performs the fixed point displacement on the observation platform 20 in correspondence with each of the observation basic coordinates. The terminal device 40 defines the correction point 41 based on the image of the view region 221 of the image observation unit 22, controls the capture portion 321 of the particle capture tool 32 to enter the view region 221 of the image observation unit 22 and adjusts the capture portion 321 of the particle capture tool 32 to align with the correction point 41, and records the capture correction coordinate of the capture portion 321. Thus the relative position correction between the image observation unit 22 on the observation platform 20 and the particle capture tool 32 on the capture platform 30 is completed, and the capture correction coordinates are established on the capture platform coordinate system B. Then, in Steps S5 and S6, the positional relationship between the capture portion 321 of the particle capture tool 32 and the positioning reference point P is corrected by the first image correction unit 11a and second image correction units 11b, 11c with different magnification ratios.

In Step S4, the capture portion 321 of the particle capture tool 32 is repeatedly aligned with each of the correction points 41 to complete the relative position correction between the observation platform coordinate system A and the capture platform coordinate system B. In this way, when the image observation unit 22 detects a biological particle at a certain position of the carrier 12, the terminal device 40 could control the mechanical arm 31 to drive the particle capture tool 32 to an accurate position according to the capture platform coordinate system B to accurately capture the detected the biological particle on the carrier 12.

In this way, the method of the current embodiment could reduce the deviation of the relative position between the particle capture tool 32 and the carrier 12 by using the multi-point correction way, thereby improving the accuracy of the particle capture tool 32 in capturing the biological particles. At the same time, in the mechanism design in the current technical field, it is extremely difficult to ensure that the carrier platform 10 and the capture platform 30 are completely parallel, that is, there might exist a certain deviated angle between the carrier platform 10 and the capture platform 30, so that the capture portion 321 would not fall exactly onto the positioning reference point P and hence a deviation of the corresponding relationship between the position coordinate of the particle capture tool 32 driven by the capture platform 30 and the actual position of the capture portion 321 would be resulted. With Steps S5 and S6 of the correction method of the current embodiment, the terminal device 40 integrally determines the deviation distance between the positioning reference point P among the images of the first image correction unit 11a and the second image correction units 11b, 11c and the capture portion 321 and calculates the deviation distance as the deviation compensation value, so that the terminal device 40 could correspondingly adjust the position coordinate of the particle capture tool 32 according to the deviation compensation value. Furthermore, if the accuracy of capturing the biological particles by the particle capture tool 32 of the capture platform 30 is lower due to machine transportation or human collision, a relationship between the observation platform 20 and the capture platform 30 could be automatically corrected through the correction method of the current embodiment, so that the problem of disassembling the machine or manually adjusting the machine could be avoided, thereby increasing the correction efficiency.

It must be pointed out that the embodiments described above are only some preferred embodiments of the present invention. All equivalent structures which employ the concepts disclosed in this specification and the appended claims should fall within the scope of the present invention.

What is claimed is:

1. A correction and capture method for a biological particle capture device, comprising:
   providing an image observation unit, which faces a side of a carrier platform, on an observation platform and orientating a view region of the image observation unit towards a carrier region of the carrier platform for taking images;
   performing a fixed point displacement on the observation platform by the image observation unit based on a plurality of observation basic coordinates set on an observation platform coordinate system and defining a correction point in an image of the view region when the image observation unit is positioned at one of the plurality of observation basic coordinates and takes the image, wherein the observation basic coordinates are position coordinates that are predetermined and correspond to the movement of the image observation unit relative to the carrier platform;
   controlling, by a terminal device, a particle capture tool on a capture platform to move relative to the carrier region on another side of the carrier platform based on a relative position of the image observation unit positioned at one of the plurality of observation basic coordinates, wherein the terminal device controls a control device of the observation platform to drive the image observation unit to move according to the observation basic coordinates predetermined on the observation platform coordinate system, and a capture portion of the particle capture tool enters the image of the view region; and
   adjusting the capture portion of the particle capture tool to align with the correction point and recording, by the terminal device, a capture correction coordinate of the capture portion located in a capture platform coordinate system of the capture platform; when the terminal device records the capture correction coordinate of the capture portion, the image observation unit is then controlled to shift to a position of another observation basic coordinate of the plurality of observation basic coordinates on the observation platform; the terminal device defines another correction point in another image of the view region generated by the image observation unit and controls the capture portion of the particle capture tool to enter the another image of the view region generated by the image observation unit according to the position of the another observation basic coordinate of the plurality of observation basic coordinates; the terminal device then controls the capture portion of the particle capture tool to align with the another correction point in the view region generated by the image observation unit, and the terminal device correspondingly records another capture correction coordinate of the capture portion.

2. The correction and capture method for the biological particle capture device as claimed in claim 1, wherein the terminal device simulates an absolute X coordinate axis and an absolute Y coordinate axis in the view region; the absolute X coordinate axis and the absolute Y coordinate axis intersect perpendicularly at a focal center of the view region to form the correction point.

3. The correction and capture method for the biological particle capture device as claimed in claim 1, wherein the view region generated by the image observation unit located in one of the plurality of observation basic coordinates and the view region generated by the image observation unit after the image observation unit is shifted to an adjacent observation basic coordinate of the plurality of observation basic coordinates are partially overlapped.

4. The correction and capture method for the biological particle capture device as claimed in claim 3, wherein a distance between adjacent two observation basic coordinates of the plurality of observation basic coordinates on the observation platform coordinate system is set between 1 mm and 7 mm.

5. The correction and capture method for the biological particle capture device as claimed in claim 1, wherein a carrier is provided on the carrier region; a transparent bottom of the carrier faces the observation platform, and a camera path of the image observation unit penetrates the carrier from the transparent bottom.

6. The correction and capture method for the biological particle capture device as claimed in claim 5, wherein the carrier is filled with a transparent liquid, and a light of the camera path of the image observation unit is projected on the transparent bottom of the carrier from a bottom of the transparent bottom and penetrates the transparent liquid.

7. The correction and capture method for the biological particle capture device as claimed in claim 1, wherein the image observation unit comprises a charge-coupled device (CCD), a complementary metal-oxide-semiconductor device (CMOS), or a combination thereof.

8. The correction and capture method for the biological particle capture device as claimed in claim 1, wherein the image observation unit uses a magnification ratio of 5 times to 100 times, and the image observation unit is controlled by the terminal device to move.

* * * * *